(12) United States Patent
Baykaner et al.

(10) Patent No.: US 12,481,920 B2
(45) Date of Patent: Nov. 25, 2025

(54) DISTRIBUTED COMPUTER SYSTEM AND METHOD OF OPERATION THEREOF

(71) Applicant: UVUE LIMITED, Bury St Edmunds (GB)

(72) Inventors: Khan Richard Baykaner, Bury St Edmunds (GB); Jiri Vestfal, Bury St Edmunds (GB); Emma Victoria Smith, Bury St Edmunds (GB)

( * ) Notice: Subject to any disclaimer, the term of this patent is extended or adjusted under 35 U.S.C. 154(b) by 758 days.

(21) Appl. No.: 17/792,451

(22) PCT Filed: Jan. 14, 2021

(86) PCT No.: PCT/IB2021/050249
§ 371 (c)(1),
(2) Date: Jul. 13, 2022

(87) PCT Pub. No.: WO2021/144729
PCT Pub. Date: Jul. 22, 2021

(65) Prior Publication Data
US 2023/0066452 A1  Mar. 2, 2023

(30) Foreign Application Priority Data

Jan. 14, 2020 (EP) .................................... 20020021

(51) Int. Cl.
*G06N 20/00* (2019.01)
*G06F 16/27* (2019.01)
(Continued)

(52) U.S. Cl.
CPC ............. *G06N 20/00* (2019.01); *G06F 16/27* (2019.01); *H04L 41/16* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 2020/0272934 A1* | 8/2020 | Manamohan | G06F 11/1425 |
| 2020/0372154 A1* | 11/2020 | Bacher | G06F 16/1834 |
| 2021/0110047 A1* | 4/2021 | Fang | G06N 20/00 |

FOREIGN PATENT DOCUMENTS

WO   2019158751 A1   8/2019

OTHER PUBLICATIONS

Harris et al., Decentralized & Collaborative AI on Blockchain, IEEE, pp. 368-375 (Year: 2019).*

(Continued)

*Primary Examiner* — David R Vincent
(74) *Attorney, Agent, or Firm* — RC Trademark Company

(57) ABSTRACT

Disclosed is a distributed computer system and a method of operation thereof. The distributed computer system includes a plurality of worker nodes. The collective learning of the worker nodes is managed within the distributed computer system. The operation of distributed computer system is coordinated by employing a distributed ledger arrangement. The distributed computer system comprises a monitoring arrangement to provide learning parameters to the worker nodes by way of executing smart contract. Each of the worker nodes is operable to train a computing model based on the learning parameters and a set of training data. The monitoring arrangement provides a reward to at least one of the worker nodes for training the computing model. The reward is determined based on a number and frequency of intermediary computing models provided by a given worker node to a remainder of the worker nodes; and a quality of the intermediary computing models.

11 Claims, 3 Drawing Sheets

(51) Int. Cl.
  *H04L 41/16*    (2022.01)
  *H04L 67/1095*  (2022.01)
  *H04L 67/1097*  (2022.01)

(56) References Cited

OTHER PUBLICATIONS

Kang et al., Incentive Mechanism for Reliable Federated Learning: A Joint Optimization Approach to Combining Reputation and Contract Theory, IEEE, pp. 10700-10714 (Year: 2019).*
Harris, et al., "Decentralized & Collaborative AI on Blockchain", published in 2019 IEEE International Conference on Blockchain in Jul. 16, 2019, pp. 368-375.
Kang, et al., "Incentive Mechanism for Reliable Federated Learning: A Joint Optimization Approach to Combining Reputation and Contract Theory", published in IEEE Internet Of Things Journal in Dec. 2019, in vol. 06, No. 06, pp. 10700-10714.
Extended European search report issued in EP Patent Application EP20020021.0 on Jun. 24, 2020, 9 pages.
International search report and written opinion issued in PCT Patent Application PCT/IB2021/050249 on May 21, 2021, 12 pages.
Zhang Haoyu et al: "SLAQ quality-driven scheduling for distributed machine learning", Proceedings of The 2022 ACM Workshop On Software Supply Chain Offensive Research and Ecosystem Defenses, ACMPUB27, New York, NY, USA, Sep. 24, 2017 (Sep. 24, 2017), pp. 390-404, XP058967447, DOI: 10.1145/3127479. 3127490 ISBN: 978-1-4503-9889-3.
Communication pursuant to Article 94(3) EPC issued for European Patent Application EP20020021.0, on Nov. 16, 2023, 08 Pages.

* cited by examiner

DISTRIBUTED COMPUTER SYSTEM AND METHOD OF OPERATION THEREOF

TECHNICAL FIELD

The present disclosure relates generally to systems and method for coordinating collective training of computing models, and more specifically, to distributed computer systems for managing collective learning of a plurality of worker nodes. The present disclosure also relates to methods of operating such distributed computer systems.

BACKGROUND

With advancements in computational sciences and technologies, computing models have found applications in a wide range of fields, such as weather forecasting, flight simulations, earthquake predictions and the like. Notably, computing models have become a commonly and widely used tool for solving complex mathematical and analytical problems with a significantly low error rate. As computing models find applications in far-ranging fields, training a computing model to provide desired results is now constituted as a preferred approach over manually programming the computing model. However, the training process of a computing model is highly labour and resource intensive, and consumes a substantial amount of time. Therefore, in recent times, a collective learning of a computing model, wherein a plurality of computing arrangements connected with each other perform training of the computing model simultaneously, is adopted extensively. Notably, adopting such a collective learning approach towards training a computing model reduces data processing load on a given computing arrangement and is also time-efficient.

Typically, such collective learning of a computing model is implemented using either a synchronous training process or an asynchronous training process. Generally, a plurality of worker nodes participate in collective training of the computing model using the plurality of computing arrangements. Notably, in a synchronous training process, each of the worker nodes must perform training of the computing model simultaneously and only move onto a next step of the training process once each of worker nodes has performed some training of the computing model. However, such synchronous training process creates an inefficiency in terms of time, as the worker nodes that perform training at a faster rate must wait for the worker nodes (namely, stragglers) with slower computing arrangements to complete their training process. Alternatively, the asynchronous training process does not enforce synchronisation between the plurality of worker nodes, wherein each node can perform the training at their own rate. However, such asynchronous training processes involve a problem of staleness, wherein intermediary trained computing models provided by worker nodes performing the training at a slower rate may be out-of-date with respect to the computing model being trained currently.

Moreover, conventional methods for collective learning across multiple worker nodes generally involve a centralised authority that may employ a hierarchy of parameter servers to provide a common computing model to a significant number of worker nodes to be trained, wherein each of the worker nodes may use a private set of training data to update the computing model and return the updated computing model for aggregation. Alternatively, some conventional methods employ network bandwidth optimisation by coordinating updates in a cyclical order amongst the worker nodes. However, such conventional methods cannot be operated in an asynchronous manner and thus having the problem of straggling worker nodes associated therewith.

Furthermore, recent asynchronous methods used for training a computing model may provide a solution to staleness by ensuring that intermediary trained computing models provided by worker nodes performing the training at a slower rate are not extremely out-of-date with respect to the computing model being trained currently. However, such methods assume a global parameter set and require that updates of the intermediary computing models should be sparse. Specifically, such methods produce a single global model, and may not train the computing model efficiently if a large amount of worker nodes concurrently overwrite the same weights of variables in the computing model. Such methods often do not perform efficiently if the worker nodes operate remotely and are not located at a same geographical location.

Therefore, in light of the foregoing discussion, there exists a need to overcome the aforementioned drawbacks associated with conventional systems and methods for coordinated training of computing models.

SUMMARY

The present disclosure seeks to provide a distributed computer system that includes a plurality of worker nodes that are coupled together via a data communication network to exchange data therebetween, wherein collective learning of the worker nodes is managed within the distributed computer system. The present disclosure seeks to provide, in the aforementioned distributed computer system, an accountability between the worker nodes, thereby ensuring a sophisticated and reliable process for training of a computing model. this avoids a need for elaborate verification of the worker nodes.

In one aspect, embodiments of the present disclosure provide a distributed computer system that includes a plurality of worker nodes that are coupled together via a data communication network to exchange data therebetween, wherein collective learning of the worker nodes is managed within the distributed computer system, wherein the worker nodes include computing arrangements to process data therein, wherein operation of the distributed computer system is coordinated by employing a distributed ledger arrangement, wherein the distributed computer system is arranged to execute at least one smart contract via use of the distributed ledger arrangement, characterized in that the distributed computer system comprises a monitoring arrangement to provide learning parameters to each of the plurality of worker nodes by way of executing the at least one smart contract, wherein each of the worker nodes is operable to train a computing model based on the learning parameters and at least one set of training data, and wherein the monitoring arrangement provides a reward to at least one of the worker nodes for training the computing model, wherein the reward is determined based on:

(i) a number and frequency of intermediary computing models provided by a given worker node to a remainder of the worker nodes; and (ii) a quality of the intermediary computing models.

The invention is of advantage in that there is provided a reliable and coordinated operation of training of a computing model. The distributed computer system of the present disclosure eliminates drawbacks of stragglers and staleness associated with conventional methods of coordinating collective learning between the worker nodes and provides an accountable management of collective learning between the worker nodes that ensure an efficient utilisation of resources of the worker nodes.

Optionally, the monitoring arrangement operates to exclude from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system.

Optionally, the plurality of worker nodes employs machine learning algorithms to train the computing model.

Optionally, the learning parameters provided by the monitoring arrangement comprise information relating to at least one of:
(i) a subset of worker nodes from the plurality of worker nodes receiving the intermediary computing models;
(ii) a synchronization mode that is followed by the plurality of worker nodes; and
(iii) a latest intermediary computing model to be trained within the distributed computer system.

More optionally, the monitoring arrangement employs a plurality of synchronization modes to coordinate intermediary computing models communicated between the plurality of worker nodes and, when in operation, is able to switch between the plurality of synchronization modes.

More optionally, the monitoring arrangement, when in operation, switches between the plurality of synchronization modes depending on a data processing load being experienced at any given time by the distributed computer system.

Optionally, the at least one smart contract includes a compensation for worker nodes having a limited computing power relative to other of the worker nodes, wherein the worker nodes of limited computing capability are limited in the frequency and number of intermediary computing models that they provide due to limitations in computing capability thereof.

In another aspect, embodiments of the present disclosure provide a method for operating a distributed computer system that includes a plurality of worker nodes that are coupled together via a data communication network to exchange data therebetween, wherein the plurality of worker nodes includes computing arrangements to process data therein, wherein collective learning is managed wherein the distributed computing system, wherein the distributed computer system employs a distributed ledger arrangement to coordinate operation of the distributed computer system, wherein the distributed computer system is arranged to execute at least one smart contract via use of the distributed ledger arrangement,
characterized in that the method includes:
(i) providing the distributed computer system with a monitoring arrangement to provide learning parameters to each of the plurality of worker nodes by way of executing the at least one smart contract, wherein each of the plurality of worker nodes is operable to train a computing model based on the learning parameters and at least one set of training data; and
(ii) arranging for the monitoring arrangement to reward at least one of the plurality of worker nodes for training the computing model, wherein the reward is determined based on a number and frequency of intermediary computing models provided by a given worker node to a remainder of the worker nodes and the quality of the intermediary computing models.

Optionally, the method comprises excluding from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system.

Optionally, the method comprises arranging for the plurality of worker nodes to employ machine learning algorithms to train the computing model.

Optionally, the method comprises arranging for the learning parameters provided by the monitoring arrangement to comprise information relating to at least one of:
(i) a subset of worker nodes from the plurality of worker nodes receiving the intermediary computing models;
(ii) a synchronization mode that is followed by the plurality of worker nodes; and
(iii) a latest intermediary computing model to be trained within the distributed computer system.

Optionally, the method comprises employing a plurality of synchronization modes to coordinate intermediary computing models communicated between the plurality of worker nodes and, when in operation, switching between the plurality of synchronization modes.

Optionally, the method comprises, when in operation, switching between the plurality of synchronization modes depending on a data processing load being experienced at any given time by the distributed computer system.

Optionally, in the method, the at least one smart contract includes a compensation for worker nodes having a limited computing power relative to other of the worker nodes, wherein the worker nodes of limited computing capability are limited in the frequency and number of intermediary computing models that they provide due to limitations in computing capability thereof.

In yet another aspect, an embodiment of the present disclosure provides a computer program product comprising a non-transitory computer-readable storage medium having computer-readable instructions stored thereon, the computer-readable instructions being executable by a computerized device comprising processing hardware to execute a method for operating a distributed computer system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
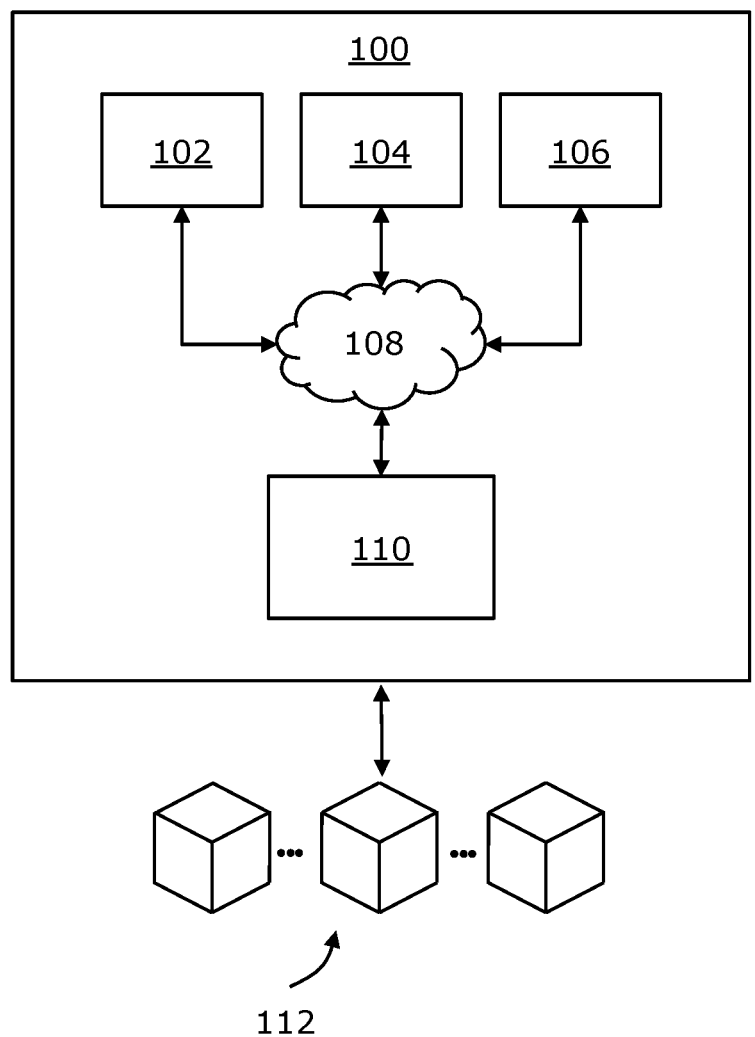
FIG. 1 is a schematic illustration of a network environment, wherein a distributed computer system is implemented, pursuant to an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, embodiments of the present disclosure provide a distributed computer system that includes a plurality of worker nodes that are coupled together via a data communication network to exchange data therebetween, wherein collective learning of the worker nodes is managed within the distributed computer system, wherein the worker nodes include computing arrangements to process data therein, wherein operation of the distributed computer system is coordinated by employing a distributed ledger arrangement, wherein the distributed computer system is arranged to execute at least one smart contract via use of the distributed ledger arrangement, characterized in that
the distributed computer system comprises a monitoring arrangement to provide learning parameters to each of the plurality of worker nodes by way of executing the at least one smart contract, wherein each of the worker nodes is operable to train a computing model based on the learning parameters and at least one set of training data, and wherein
the monitoring arrangement provides a reward to at least one of the worker nodes for training the computing model, wherein the reward is determined based on:
(i) a number and frequency of intermediary computing models provided by a given worker node to a remainder of the worker nodes; and
(ii) a quality of the intermediary computing models.

In another aspect, embodiments of the present disclosure provide a method for operating a distributed computer system that includes a plurality of worker nodes that are coupled together via a data communication network to exchange data therebetween, wherein the plurality of worker nodes includes computing arrangements to process data therein, wherein collective learning is managed wherein the distributed computing system, wherein the distributed computer system employs a distributed ledger arrangement to coordinate operation of the distributed computer system, wherein the distributed computer system is arranged to execute at least one smart contract via use of the distributed ledger arrangement, characterized in that the method includes:
(i) providing the distributed computer system with a monitoring arrangement to provide learning parameters to each of the plurality of worker nodes by way of executing the at least one smart contract, wherein each of the plurality of worker nodes is operable to train a computing model based on the learning parameters and at least one set of training data; and
(ii) arranging for the monitoring arrangement to reward at least one of the plurality of worker nodes for training the computing model, wherein the reward is determined based on a number and frequency of intermediary computing models provided by a given worker node to a remainder of the worker nodes and the quality of the intermediary computing models.

The distributed computer system and method of operating the distributed computer system as described in the present disclosure employ a distributed ledger arrangement to coordinate collective learning of the computing model and provide a training process that is efficient in utilisation of labour and resources of worker nodes associated therewith. Furthermore, the distributed computer system provides a highly time-efficient training process. Notably, the distributed computer system ensures the coordination between the plurality of worker nodes thereof by employing the distributed ledger arrangement and specifically, the at least one smart contract. Specifically, the at least one smart contract executed on the distributed ledger arrangement provides learning parameters to each of the worker nodes performing the training of the computing model. More specifically, the learning parameters ensure a coordinated working of the worker nodes, as the learning parameters establish targets for the training process and synchronisation modes for the training process. It will be appreciated that the distributed computer system has the ability to switch between synchronisation modes of the training process. Notably, the distributed computer system, and specifically, the monitoring arrangement may switch the synchronisation mode from asynchronous to synchronous if intermediary computing models received from a portion of worker nodes are substantially out-of-date. Alternatively, the monitoring arrangement may switch the synchronisation mode from synchronous to asynchronous to significantly accelerate the training process of the computing model. Furthermore, the distributed computer system of the present disclosure ensures accountability in the training process from the worker nodes regarding the training process and quality of intermediary computing models provided thereby. Additionally, worker nodes not performing at a desired output and efficiency may be excluded from the system, thus maintaining integrity and reliability of the system. Moreover, the reward provided by the monitoring arrangement is determined in a manner to incentivise efficient working of the worker nodes, thereby ensuring better performance therefrom. Furthermore, the worker nodes in the distributed computer system of the present disclosure do not merely provide datasets for training of the computing model and/or intermediary computing models, but instead provide the training to the models as well, thereby reducing computational effort required to track the datasets for training of the computing models.

The distributed computer system of the present disclosure enables management of the plurality of worker nodes, wherein each of the plurality of worker nodes process data to train a computing model collectively. Notably, the collective learning management system is implemented in communication with a distributed ledger arrangement, wherein the system uses said distributed ledger arrangement, specifically, the at least one smart contract, to enforce coordination and accountability between the plurality of worker nodes collectively training the computing model.

Furthermore, the worker nodes include computing arrangements that are operable to respond to, and processes instructions and data therein. Optionally, the computing arrangements include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the system. Optionally, the computing arrangements are processing devices that operate automatically. In such regard, the computing arrangements are equipped with artificial intelligence algorithms that responds to and performs the instructions that drive the system based on data learning techniques. More optionally, the computing arrangements are processing devices that responds to and performs the instructions that drive the system based on an input provided from a user (namely, the worker nodes participating in the system). Furthermore, the collective learning of the worker nodes is managed within the distributed computer system. Notably, the computing model is trained between the plurality of worker nodes in a manner that the intermediary computing models that have been partially trained are shared between the worker nodes and resources of worker nodes are utilized productively.

Moreover, the plurality of worker nodes are communicably coupled to each other via the data communication network. The data communication network allows for communication among the plurality of worker nodes. In other words, each of the plurality of worker nodes is capable of communicating with other worker nodes via the data communication network in order to facilitate training of the computing model. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols.

The operation of the distributed computer system is coordinated by employing the distributed ledger arrangement. Herein, the term "distributed ledger arrangement" refers to a ledger (such as a database) comprising entries recording operations and/or contracts, with a timestamp. Pursuant to embodiments of the present disclosure, the distributed ledger arrangement refers to a database of the entries or blocks. Moreover, the distributed ledger arrangement is consensually shared and synchronised in a decentralised form across the plurality of worker nodes. In this regard, the ledger is consensually shared and synchronised across multiple sites, institutions or geographies. Optionally, such worker nodes are established across different locations and operated by different users. Beneficially, the distributed ledger arrangement eliminates the need of a central authority to maintain the distributed ledger arrangement and protect it against manipulation. Specifically, the entries or blocks in the distributed ledger arrangement are monitored publicly, thereby making the distributed ledger arrangement robust against attacks. Notably, the worker nodes may be independent entities that may become a part of the distributed computer system and provide resources thereof in exchange for a reward provided as a compensation for the resources used thereof for training the computing model.

It will be appreciated that the plurality of worker nodes (namely, peers) in the distributed ledger arrangement may access each of the entries in the distributed ledger arrangement and may own an identical copy of each of the entries. Notably, an alteration made to the distributed ledger arrangement is reflected almost instantly to each of the plurality of worker nodes. Subsequently, an addition of an entry is completed when all or some of the plurality of worker nodes perform a validation with respect to the addition. In such case, the entry is recorded (namely, added) in the distributed ledger arrangement in an immutable form when at least a threshold number of worker nodes from the plurality of worker nodes reach a consensus that the entry is valid. Alternatively, recording of the entry or the block is denied when the threshold number of worker nodes reach a consensus that the entry is invalid. In an example, the threshold number of worker nodes to reach a consensus may be more than fifty percent of the plurality of worker nodes. Optionally, information in the distributed ledger arrangement is stored securely using cryptography techniques.

The distributed ledger arrangement is arranged to execute at least one smart contract via use of the distributed ledger arrangement. Herein, the term "smart contract" refers to a computer protocol implemented using the distributed ledger arrangement comprising information required to coordinate the collective learning of the worker nodes by the distributed computer system. Moreover, the smart contract permits trusted execution thereof without involving a central authority, legal system, or externally enforced mechanisms. Pursuant to the embodiments of the present disclosure, the smart contract is employed to coordinate learning between the worker nodes and to ensure that the learning parameters relating to training of the computing model are provided to the plurality of worker nodes.

The distributed computer system comprises a monitoring arrangement. Notably, the monitoring arrangement is communicably coupled to the plurality of worker nodes in the distributed computer system. Herein, the monitoring arrangement is operable to track operation of each of the worker nodes and ensure a coordinated collective training of the computing model. Furthermore, the monitoring arrangement may include, but is not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the monitoring arrangement can be one or more individual processors, processing devices and various elements associated with a processing device that may be shared by other processing devices.

Throughout the present disclosure, the term "computing model" refers to mathematical and/or analytical model that comprises a plurality of variables therein, wherein the mathematical model provides different outputs based on changing values of the plurality of variables. In an example, the computing model may comprise at least one of: multivariable functions, computational algorithms, statistical variables and the like. Furthermore, the computing model is trained using one or more set of training data, wherein the training data is customised based on the function and desired output required from the computing model.

Pursuant to embodiments of the present disclosure, the system and method described herein relate to collective training of the computing model. Specifically, the plurality of worker nodes are utilized to ensure that resources thereof are efficiently managed. It will be appreciated that the computing model is trained by the plurality of worker nodes in at least one iteration and possibly, in a plurality of iterations. Specifically, the worker nodes collectively train the computing model and perform the training in multiple iterations prior to obtaining the trained computing model. Notably, at the end of each iteration, each of the plurality of worker nodes has an intermediary computing model, that has been partially trained thereby. Subsequently, at the end of each iteration, at least one smart contract is added to the distributed ledger arrangement as a block to establish the learning parameters for the next iteration. Furthermore, a status and count of each iteration and a number of total iterations utilised for training of the computing model may be stored in the at least one smart contract. Optionally, one or more worker nodes may provide intermediary computing models thereof to one or more remainder worker nodes, wherein the one or more remainder worker nodes may train the received intermediary computing models further or may incorporate training of the received intermediary computing models in their own intermediary computing models.

The monitoring arrangement provides learning parameters to each of the plurality of worker nodes by way of executing the at least one smart contract. Notably, the learning parameters function as training instructions for the plurality of worker nodes. Specifically, the plurality of worker nodes train the computing model based on the learning parameters. It will be appreciated that each of the plurality of worker nodes is communicably connected to the distributed ledger arrangement. The monitoring arrangement of the present disclosure uses the distributed ledger arrangement to ensure coordinated learning between the plurality of worker nodes and to ensure that resources of the plurality of worker nodes are effectively utilized, in that the worker nodes are training the computing model in tandem with each other and promoting the overall collective training of the computing model.

The at least one smart contract is employed to establish the latest learning parameters for training of the computing model. Specifically, the at least one smart contract is added as an entry on the distributed ledger arrangement, wherein the at least one smart contract enforces the learning parameters on the worker nodes. More specifically, the at least one smart contract is executed at every iteration of the training of the computing model, to establish learning parameters for that particular iteration of training of the computing model. It will be appreciated that various factors and conditions affect the manner the computing model is trained. Therefore, such factors and conditions are provided and enforced by the at least one smart contract.

Furthermore, each of the worker nodes is operable to train the computing model based on the learning parameters and at least one set of training data. Notably, the at least one set of training data is employed to extract learning therefrom computationally and provide such extracted learning to the computing model. In an instance, the at least one set of training data for each worker nodes may be different. In another instance, the at least one set of training data may be common for the plurality of worker nodes. Furthermore, the computing arrangements of each of the worker nodes are employed to train the computing model based on the at least one set of training data and the learning parameters.

Optionally, the plurality of worker nodes employ machine learning algorithms to train the computing model. Notably, machine learning algorithms are implemented on the computing arrangements of the worker nodes to train the computing model. The machine learning algorithms function to train the computing model in order to achieve a desired result. Specifically, the machine learning algorithms are programmed by the worker nodes according to the desired result required from the computing model. Typically, the machine learning algorithms function by providing a training dataset to the computing model and programming an output required from the computing model. Subsequently, the trained computing model undergoes testing by the worker nodes to ensure its desired functioning. The machine learning algorithms provide a sophisticated method of training a computing model without explicitly programming instructions therein. Specifically, the machine learning algorithms train the computing model by way of providing the computing model one or more sets of training data and ensuring that the computing model learns by way of the exemplary one or more sets of training data. It will be appreciated that training the computing model using machine learning algorithms is a time and labour-intensive process and thus requires efficient and planned utilisation of resources of the plurality of worker nodes. Furthermore, due to the complex and resource-intensive nature of the training process, the plurality of worker nodes function in tandem with each other to simultaneously train the computing model results in a more efficient process. Specifically, the system and method described herein ensure that the training of the computing model does not occur in information silos, involving multiple worker nodes repeating the same training of the computing model. Therefore, to eliminate such inefficiency in the training process, the system and method of the present disclosure ensure information sharing from at least one worker node to another at least one worker node in the remainder plurality of worker nodes.

Optionally, in an embodiment wherein the machine learning algorithms, and specifically deep neural networks, are employed to train the computing model, the computing model is at least one multivariable function. Consequently, each iteration involving an intermediary computing model comprises calculating a gradient of the at least one multivariable function. Specifically, the gradient refers to a vector-valued function that stores partial derivatives of the at least one multivariable function. Notably, calculating a gradient at each iteration to obtain an intermediary computing model comprises reducing the error and ensuring that the final trained computing model closely represent the data trends in the training dataset. Therefore, with each iteration the values of the gradients and weight of variable relating thereto are varied and the data trends are monitored to achieve a minimised error.

Optionally, the learning parameters provided by the monitoring arrangement comprise information relating to at least one of:
(i) a subset of worker nodes from the plurality of worker nodes receiving the intermediary computing models;
(ii) a synchronization mode that is followed by the plurality of worker nodes; and
(iii) a latest intermediary computing model to be trained within the distributed computer system.

Optionally, in this regard, the learning parameters provided by the monitoring arrangement by way of executing at least one smart contract comprise information relating to a subset of worker nodes from the plurality of worker nodes receiving the intermediary computing models. As aforementioned, the computing model is trained by the plurality of worker nodes in at least one iteration and possibly, in a plurality of iterations. Specifically, in each iteration of the training of the computing model, one or more intermediary computing models are obtained by a given set of one or more worker nodes that is to be communicated to the subset of worker nodes in the plurality of worker nodes. Subsequently, after the one or more intermediary computing models are communicated to subset of worker nodes, the subset of worker nodes may train the received one or more intermediary computing models in the next iteration of the training process. Therefore, the at least one smart contract comprises information relating to the subset of worker nodes receiving the intermediary computing models. Herein, such information may include communication addresses of the computing arrangements of such worker nodes in the subset of worker nodes. In an example, such information may comprise addresses of such worker nodes on the distributed ledger arrangement. Such communication information provided by the at least one smart contract informs the worker nodes that are providing the intermediary computing models about which worker nodes are to receive the intermediary computing models In an embodiment, wherein machine learning algorithms are employed to train the computing model, the intermediary computing models provide details relating to the gradient that the subset of worker nodes will push next updates thereof to in the subsequent iteration of the training process. Specifically, one or more worker nodes in the plurality of worker nodes may obtain gradients in an iteration of the training process that comprises a substantially reduced error in comparison to the previous iteration. Therefore, details of such gradient may be provided as intermediary computing models to the subset of worker nodes that they may push their next updates to in the next iteration of the training process.

Optionally, in this regard, the learning parameters provided by the monitoring arrangement by way of executing at least one smart contract comprise a latest intermediary computing model to be trained within the distributed computer system. Specifically, the latest intermediary computing model refers to a target for the plurality of worker nodes that each of the worker nodes may aim for in the iteration of the training process occurring after the execution of the given at least one smart contract. As aforementioned, at the end of each iteration of the training process, the at least one smart contract added to the distributed ledger arrangement establishes learning parameters for the next iteration. Therefore, the at least one smart contract establishes the latest intermediary computing model that is to be achieved by the worker nodes in the subsequent iteration of the training process. It will be appreciated that the at least one smart contract may comprise information relating to a plurality of latest intermediary computing models. Specifically, different sets of worker nodes in the system may train towards different targets of training the computing model based on resource capacity and training abilities thereof. Therefore, in an embodiment, a plurality of latest intermediary computing models to be trained are allocated based on capability of training of the worker node.

Optionally, in an embodiment, wherein machine learning algorithms are employed to train the computing model, the latest intermediary computing model relates to a gradient target that a computing model is to be trained towards by the worker nodes. Specifically, as aforementioned, the computing model is trained by the plurality of worker nodes in an iterative process, wherein each iteration of the training process pushes the computing model further towards the trained computing model. Therefore, each gradient target established at every iteration of the training process pushes the computing model trained by the machine learning algorithms towards a minimised error.

Optionally, the learning parameters comprise information relating to a plurality of latest intermediary computing models to be trained by different sets of worker nodes from the plurality of worker nodes. It will be appreciated that different worker nodes in the plurality of worker nodes have different levels of resource capacity and thus, are able to train the computing model at different rates of training. Therefore, the monitoring arrangement may determine a plurality of latest intermediary computing models, relating to a plurality of gradient targets, and may allocate different gradient targets to different sets of worker nodes, wherein worker nodes in a given set of worker nodes comprise similar resource capacity and also exhibit similar rate of training. Such estimation of the resource capacity of the worker nodes may be determined by monitoring an average delay in providing an intermediary computing model by each worker node and/or by monitoring performance metrics of each of the worker node.

Optionally, in this regard, the learning parameters provided by the monitoring arrangement by way of executing at least one smart contract comprise a synchronization mode that is followed by the plurality of worker nodes. Notably, the training of the computing model may be performed by the plurality of worker nodes in a synchronous synchronization mode or an asynchronous synchronization mode. Specifically, in a synchronous synchronization mode, each of the worker nodes perform training of computing model and provide an intermediary computing model before proceeding to the next iteration of the training process. Alternatively, in the asynchronous synchronization mode, each of the worker nodes perform training independent of the training progress of other worker nodes in the plurality of worker nodes. Each of the synchronous and asynchronous synchronization mode provide different sets of advantages, wherein in the synchronous synchronization mode, the intermediary computing models are developed at a substantially coordinated rate while in asynchronous synchronization mode, the training process can proceed at a faster rate. However, in synchronous synchronization mode, the worker nodes with a faster training rate have to wait for the worker nodes with a slower training rate to complete their training and in asynchronous synchronization mode, the intermediary computing models provided by worker nodes with a slower training rate may be out-of-date with respect to the latest intermediary computing model being trained. It will be appreciated that each of the synchronization mode has advantages and drawbacks associated therewith, and therefore based on state of training process of the computing model, the at least one smart contract provides information relating to the synchronization mode to be followed by the plurality of worker nodes in that given iteration of the training process.

Optionally, the monitoring arrangement employs a plurality of synchronization modes to coordinate intermediary computing models communicated between the plurality of worker nodes and, when in operation, is able to switch between the plurality of synchronization modes. As aforementioned, the smart contract provides information relating to the synchronization mode to be followed by the plurality of worker nodes. The monitoring arrangement employs a plurality of synchronization modes, specifically, the synchronous synchronization mode or asynchronous synchronous synchronization mode to coordinate the training process of the plurality of worker nodes. In an instance, the synchronization mode followed by the plurality of worker nodes is asynchronous synchronization mode. Subsequently, the monitoring arrangement detects that a substantial number of worker nodes are lagging behind in the training process and are providing intermediary computing models that are not in-line with the latest intermediary computing model being trained. Therefore, the monitoring arrangement is able to switch the synchronization mode to synchronous synchronization mode to restore coordination between the plurality of worker nodes.

Optionally, the monitoring arrangement, when in operation, switches between the plurality of synchronization modes depending on a data processing load being experienced at any given time by the distributed computer system. Notably, the data processing load being experienced by the distributed computer system is dependent on the synchronization mode being followed by the plurality of worker nodes. In an instance, the data processing load experienced by the distributed computer system may be higher when the asynchronous synchronization mode is being followed by the plurality of worker nodes as the number of intermediary computing models communicated between the worker nodes in such synchronization mode may be substantially higher than in the synchronous synchronization mode. Specifically, in asynchronous synchronization mode, the worker nodes may communicate intermediary computing models at will thereof and not at a coordinated predetermined time and therefore, maintaining coordination between the plurality of worker nodes may require higher data processing. Therefore, in such instance, the monitoring arrangement may switch to synchronous synchronization mode to reduce the data processing load on the distributed computer system.

The monitoring arrangement provides a reward to at least one of the worker nodes for training the computing model. As aforementioned, the plurality of worker nodes of the distributed computer system may train the computing model and provide resources thereof in exchange for a reward provided as a compensation for the resources thereof. Therefore, at least one of the worker nodes providing a substantial contribution of resources towards obtaining the trained computing model is rewarded. Beneficially, such reward-based system ensures an accountable performance of the worker nodes and furthermore encourages the worker nodes to employ higher proportion of resources for a higher reward. Therefore, such investment of the worker nodes towards training the computing model may provide a computing model that has been trained to exhibit a significantly low error rate and a higher efficiency in the training of the computing model. Herein, the term "reward" refers to a financial incentive and/or a technological incentive, provided to at least one of the plurality of worker nodes as a compensation for providing resources for training the computing model. Herein, the monitoring arrangement may provide the reward to at least one of the worker nodes by way of a smart contract.

The reward is determined based on:
(i) a number and frequency of intermediary computing models provided by a given worker node to a remainder of the worker nodes; and
(ii) a quality of the intermediary computing models.

The plurality of worker nodes may provide a plurality of intermediary computing models, wherein the intermediary computing models correspond to training targets established by the learning parameters by way of the at least one smart contract. Specifically, the intermediary computing models refer to partially trained computing models provided by the worker nodes to obtain a trained computing model in a stepped iterative process. It will be appreciated that the trained computing model may not be obtained in a single-step procedure by a worker node and is obtained by the plurality of worker nodes participating in a collaborative training process using the distributed ledger arrangement. Therefore, worker nodes may provide intermediary computing models for remainder of the worker nodes in the distributed computer system in order to establish their contribution to the training progress and to achieve an efficient training process by using intermediary computing models that exhibit lower error rate in comparison to others, to train further. Therefore, the monitoring arrangement provides a reward based on the number and frequency of the intermediary computing models provided by a given worker node. Notably, if a given worker node provides a higher number of intermediary worker node at a significantly short intervals of time in the training process, such given worker node is an active participant and valued contributor to the training of the computing model and may be rewarded accordingly. Furthermore, the reward is determined based on the quality of the intermediary computing models provided by the worker nodes, wherein a measure of determining quality is dependent on a type of the computing model. In an example, for a given computing model, a measure of quality may be an error rate of the computing model. In another example, for a given computing model, a measure of quality may be time efficiency of the computing model. Notably, the monitoring arrangement is operable to analyze the quality of intermediary computing models to determine a degree of training of the intermediary computing model provided thereto by the worker node. Specifically, a portion of the worker nodes in the plurality of worker nodes may provide a sophisticated degree of training to the computing model that may contribute significantly to the complete training of the computing model, whereas another portion of the worker nodes may not be capable of providing a satisfactory training to the computing model and thus, the intermediary computing models thereof may have higher error rate. Therefore, the monitoring arrangement analyses each of the intermediary computing model and contribution thereof towards the trained computing model and thereafter, rewards the worker nodes accordingly.

Optionally, the at least one set of training data used for training of the computing model may be owned by one or more worker nodes of the plurality of worker nodes and/or may be provided by the monitoring arrangement to one or more worker nodes. Optionally, the at least one set of training data may be private to a given worker node, or may be public and commonly shared between the worker nodes, or a combination thereof. In an instance, if the at least one set of training data is privately owned by a given worker node and is used to obtain an efficiently trained computing model, such given worker node may be provided a higher reward in comparison to other worker nodes in the distributed computer system.

Optionally, the reward provided to the at least one of the worker nodes for training the computing model is based on the characteristics of the at least one set of training data. Specifically, the characteristics primarily refer to ownership of the at least one set of training data. In an instance, a worker node using a given set of training data owned thereby to train the computing model may be provided a higher reward in comparison to a worker node receiving a set of training data from the monitoring arrangement.

Optionally, the trained computing model provided by at least one of the plurality of worker nodes is public to the plurality of worker nodes. Alternatively, optionally, the trained computing model is shared privately with the monitoring arrangement by at least one of the plurality of worker nodes.

In an embodiment, the monitoring arrangement may analyse plurality of trained computing models received from plurality of worker nodes and may identify a trained computing model with a minimum error rate and/or a highest quality. Consequently, one or more worker nodes associated with such trained computing model are provided a reward in proportion to a contribution thereof towards the computing model. In an instance, the worker nodes providing the trained computing model with a minimum error rate and/or a highest quality may be provided a major fraction (for example, half) of the reward provided by the monitoring arrangement, wherein each of the worker nodes training the computing model may use a private set of training data. The remaining fraction of the total reward may be distributed proportionally according to the intermediary computing models received from other worker nodes that contributed towards the trained model with a minimum error rate and/or a highest quality. For example, if a given worker node 'A' obtained the most efficiently trained computing model and during training, reported receiving 75 intermediary computing models from a worker node 'B', and 25 intermediary computing models from a worker node 'C', the monitoring arrangement may distribute 50% of the reward to the worker node 'A', 37.5% of the reward to the worker node 'B', and 12.5% of the reward to the worker node 'C'. Beneficially, such reward-based system may incentivise worker nodes that are providing efficient training to the computing model even if they are not generating the most efficient computing model and therefore, may promote the plurality of worker nodes to perform in a highly productive manner.

Optionally, the monitoring arrangement requests a deposit from each of the plurality of worker nodes from participating in the training of the computing model, wherein a collection of the deposits from the plurality of worker nodes is distributed proportionately among at least one of the plurality of worker nodes providing the trained computing model.

Optionally, the at least one smart contract includes a compensation for worker nodes having a limited computing power relative to other of the worker nodes, wherein the worker nodes of limited computing capability are limited in the frequency and number of intermediary computing models that they provide due to limitations in computing capability thereof. It will be appreciated that different worker nodes in the distributed computer system possess differing computing capabilities. Therefore, the worker nodes having a limited computing capability may provide a lower number of intermediary computing models at a lower frequency rate in comparison to worker nodes having a high computing capability. However, the intermediary computing models provided by the worker nodes with a limited computing capability may have a higher quality thereto and may contribute significantly towards the trained computing model despite being limited in the frequency and number of intermediary computing models provided thereby. Therefore, the monitoring arrangement by way of at least one smart contract accordingly compensates such worker nodes with limited computing capability for training the computing model.

Optionally, the monitoring arrangement operates to exclude from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system. As aforementioned, the monitoring arrangement monitors the number, frequency and quality of each intermediary computing model provided by the plurality of worker nodes. Therefore, the monitoring arrangement excludes the worker nodes whose number and/or frequency of intermediary computing model is below a predefined threshold. Alternatively, one or more worker nodes of the distributed computer system may report unreceived intermediary computing models that were expected thereby from a given worker node and such worker node may be analyzed for exclusion from the distributed computer system by the monitoring arrangement. In an instance, the predefined threshold may be defined by the monitoring arrangement as the minimum number and rate at which each of the worker nodes is to provide an intermediary computing model. Additionally, the predefined threshold may be defined based on computing capabilities of the worker nodes, wherein the values of predefined thresholds may differ for worker nodes with differing computing capabilities. Moreover, the monitoring arrangement may exclude worker nodes whose intermediary computing models are found to be erroneous to the operation of the distributed computer system and specifically, to the training of the computing models. Specifically, one or more worker nodes may intentionally provide faulty intermediary computing models, wherein such faulty intermediary computing models may not contribute towards training of the computing model or possibly, negatively affect the training process. It will be appreciated that such faulty intermediary computing models may be reported by one or more worker nodes of the distributed computer system. Therefore, if such faulty intermediary computing models are regularly received from a given worker node, such worker node may be excluded from the distributed computer system. Furthermore, upon exclusion of a given worker node from the distributed computer system, the given worker node may not receive any intermediary computing models. Additionally, intermediary computing models communicated by the given worker node that has been excluded are not received by the remainder of the worker nodes.

The present disclosure also relates to the method as described above. Various embodiments and variants disclosed above apply mutatis mutandis to the method.

Optionally, the method comprises excluding from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system.

Optionally, the method comprises arranging for the plurality of worker nodes to employ machine learning algorithms to train the computing model.

Optionally, the method comprises arranging for the learning parameters provided by the monitoring arrangement to comprise information relating to at least one of:
(i) a subset of worker nodes from the plurality of worker nodes receiving the intermediary computing models;
(ii) a synchronization mode that is followed by the plurality of worker nodes; and
(iii) a latest intermediary computing model to be trained within the distributed computer system.

Optionally, the method comprises employing a plurality of synchronization modes to coordinate intermediary computing models communicated between the plurality of worker nodes and, when in operation, switching between the plurality of synchronization modes.

Optionally, the method comprises, when in operation, switching between the plurality of synchronization modes depending on a data processing load being experienced at any given time by the distributed computer system.

Optionally, in the method, the at least one smart contract includes a compensation for worker nodes having a limited computing power relative to other of the worker nodes, wherein the worker nodes of limited computing capability are limited in the frequency and number of intermediary computing models that they provide due to limitations in computing capability thereof.

In yet another aspect, an embodiment of the present disclosure provides a computer program product comprising a non-transitory computer-readable storage medium having computer-readable instructions stored thereon, the computer-readable instructions being executable by a computerized device comprising processing hardware to execute a method for operating a distributed computer system.

DETAILED DESCRIPTION OF THE DRAWINGS

Referring to FIG. 1, illustrated is a schematic illustration of a network environment, wherein a distributed computer system 100 is implemented, pursuant to an embodiment of the present disclosure. The distributed computer system 100 includes a plurality of worker nodes, such as the worker nodes 102, 104, 106, that are coupled together via a data communication network 108 to exchange data therebetween. Notably, collective learning of the worker nodes, such as the worker nodes 102, 104, 106 is managed within the distributed computer system 100. The worker nodes 102, 104, 106 include computing arrangements to process data therein. Furthermore, operation of the distributed computer system 100 is coordinated by employing a distributed ledger arrangement 112. The distributed computer system 100 is arranged to execute at least one smart contract via use of the distributed ledger arrangement 112. The distributed computer system 100 comprises a monitoring arrangement 110 to provide learning parameters to each of the plurality of worker nodes 102, 104, 106 by way of executing the at least one smart contract. Specifically, each of the worker nodes 102, 104, 106 is operable to train a computing model based on the learning parameters and at least one set of training data. The monitoring arrangement 110 provides a reward to at least one of the worker nodes 102, 104, 106 for training the computing model, wherein the reward is determined based on:
(i) a number and frequency of intermediary computing models provided by a given worker node to a remainder of the worker nodes; and
(ii) a quality of the intermediary computing models.

Figure 2:
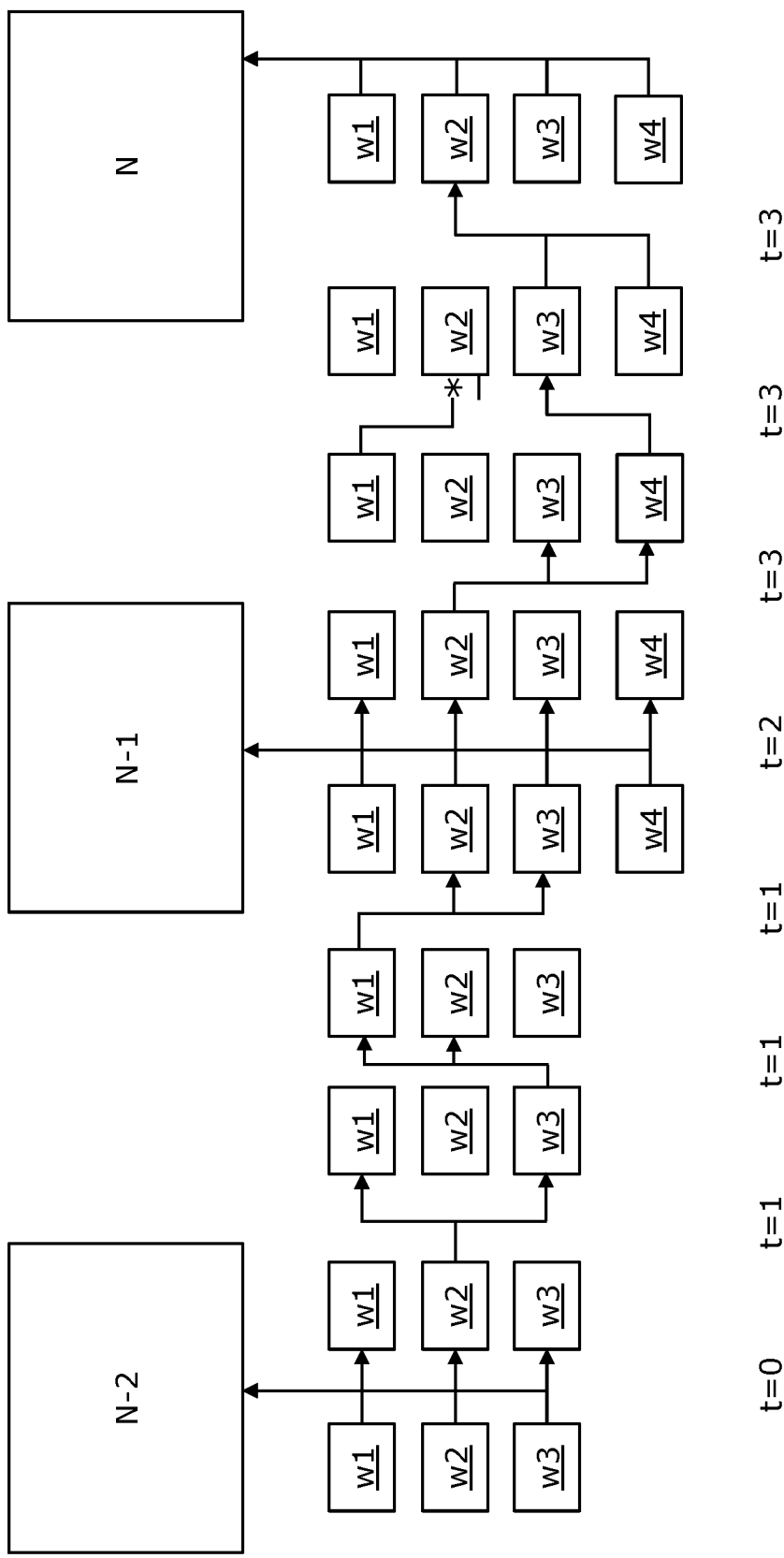
FIG. 2 is a block diagram depicting an exemplary execution of smart contracts by a monitoring arrangement for coordinating operation of worker nodes, in accordance with an embodiment of the present disclosure.

Referring to FIG. 2, illustrated is a block diagram depicting an exemplary execution of smart contracts by a monitoring arrangement (such as the monitoring arrangement 110 of FIG. 1) for coordinating operation of worker nodes, in accordance with an embodiment of the present disclosure. At a time t=0, the distributed computer system comprises the worker nodes w1, w2 and w3. Furthermore, at the time t=0, a smart contract is added to a block N-2 of a distributed ledger arrangement (such as the distributed ledger arrangement 112). The smart contract added to the block N-2 provides learning parameters for an iteration N-2 of the training process for a computing model. Such smart contract provides subset of worker nodes receiving the intermediary computing models from the remainder of worker nodes. Herein, at t=1, each of the worker nodes w1, w2 and w3 receives intermediary computing models from the remainder of worker nodes in the distributed computer system. Specifically, worker node w2 communicates intermediary computing models to worker nodes w1 and w3, worker node w3 communicates intermediary computing models to worker nodes w1 and w2 and worker node w1 communicates intermediary computing models to remainder worker nodes w2 and w3.

At a time t=2, a smart contract is added to a block N-1 of a distributed ledger arrangement. At time t=2, the monitoring arrangement by way of the smart added to the block N-1 excludes the worker node w1 from the distributed computer system. Furthermore, another worker node w4 is added to the distributed computer system. Moreover, such smart contract establishes the worker nodes that are to be communicating the intermediary computing models thereof and the worker nodes that are to be receiving the intermediary computing models. Herein, at time t=3, the worker node w2 communicates the intermediary computing models to worker nodes w3 and w4, the worker node w4 communicates the intermediary computing model to worker node w3, and worker nodes w3 and w4 communicate intermediary computing models thereof to worker node w2. Moreover, as shown in the FIG. 3, the intermediary computing model communicated by worker node w1 to worker node w2 is not received thereby due to worker node w1 being excluded from the distributed computer system by the smart contract added to the block N-1. Furthermore, each of the worker nodes provide computing models at the end of each step (specifically at t=0, t=2 and t=3) to the monitoring arrangement by way of the blocks.

It will be appreciated that any or all of smart contracts added to the blocks N-2, N-2 and N of the distributed ledger arrangement provide latest intermediary computing model to be trained in the next iteration of the training process and also, may switch the synchronisation mode that is to be followed by the plurality of worker nodes.

It may be understood by a person skilled in the art that FIG. 2 illustrates a simplified execution of smart contracts by the monitoring arrangement, for sake of clarity, which should not unduly limit the scope of the claims herein. The person skilled in the art will recognize many variations, alternatives, and modifications of embodiments of the present disclosure.

Figure 3:
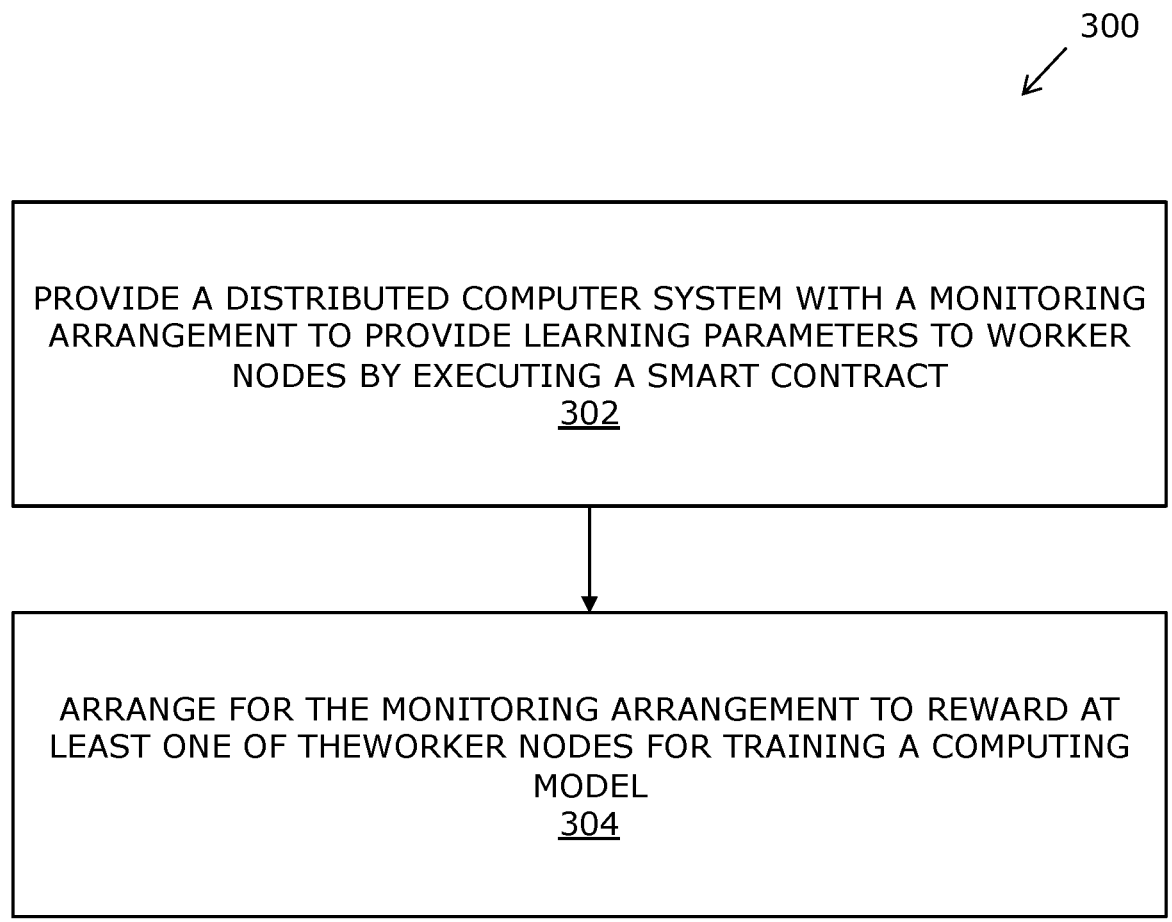
FIG. 3 is a flow chart depicting steps of method for operating a distributed computer system, in accordance with an embodiment of the present disclosure.

Referring to FIG. 3, illustrated is a flow chart depicting steps of method 300 for operating a distributed computer system, in accordance with an embodiment of the present disclosure. The distributed computer system (such as the distributed computer system 100 of FIG. 1) that includes a plurality of worker nodes (such as the worker nodes 102, 104, 106) that are coupled together via a data communication network to exchange data therebetween. The plurality of worker nodes includes computing arrangements to process data therein, wherein collective learning of the worker nodes is managed within the distributed computer system. The distributed computer system employs a distributed ledger arrangement (such as the distributed ledger arrangement 112 of FIG. 1) to coordinate operation of the distributed computer system, wherein the distributed computer system is arranged to execute at least one smart contract via use of the distributed ledger arrangement. At a step 302, the distributed computer system is provided with a monitoring arrangement to provide learning parameters to each of the plurality of worker nodes by way of executing the at least one smart contract, Notably, each of the plurality of worker nodes is operable to train a computing model based on the learning parameters and at least one set of training data. At a step 304, the monitoring arrangement is arranged to reward at least one of the plurality of worker nodes for training the computing model. The reward is determined based on a number and frequency of intermediary computing models provided by a given worker node to a remainder of the worker nodes and a quality of the intermediary computing models.

The steps 302 and 304 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

APPENDIX

An example script of executable code for implementing a smart contract coordinator is given below, as an enabling disclosure:

| Example function implementation | Description |
| --- | --- |
| // Add new client<br>@action<br>function addClient(new_client :ClientAddress)<br>if faulty_clients_list.contains(new_client)<br>return; // Client rejected<br>endif<br>active_clients_list.add(new_client);<br>endfunction | Adds a new worker node to the plurality of worker nodes. Excludes previously banned participants. |
| // Update coordination state<br>@action<br>function setCoordinationState(current_client :<br>ClientAddress)<br>if current_client is not SMART_CONTRACT_OWNER<br>return // Only contract owner can run this function<br>endif<br>coordination_state.clear( );<br>for (client : active_clients_list)<br>if isFaulty(client)<br>active_clients_list.remove(client);<br>faulty_clients_list.add(client);<br>continue;<br>endif<br>var<br>peers= randomSelect(active_clients_list.exclude(client)<br>,number_of_peers);<br>coordination_state.add(client,peers);<br>loop<br>var statistics = active_clients_list.getStatistics( );<br>if statistics.calculate_std_dev( ) > std_dev_treshold<br>coordination_state.setSyncMode(SYNCHRONOUS);<br>else<br>coordination_state.setSyncMode(ASYNCHRONOUS);<br>endif<br>endfunction | Updates list of worker nodes from which to select where new updates should be pushed and synchronisation mode. |
| // example of method for detecting faulty clients<br>function isFaulty(client : ClientAddress) : 37oolean<br>var sent_updates= client.getSentUpdatesCount( );<br>var received_updates =<br>active_clients_list.exclude(client).getReceivedUpdatesCount(client);<br>if sent_updates* UPDATE_TRESHOLD > received_updates<br>return true;<br>endif<br>return false;<br>endfunction | Technical check for faulty worker nodes. Worker nodes deemed faulty no longer receive updates from other worker nodes, and their updates will be ignored in future. |
| // method to get clients statistics<br>function getStatistics(clients : list< ClientAddress> ) : Statistics<br>var statistics = Statistics( );<br>for client : clients<br>statistics.add(client.getId( ), client.getLossValues( ));<br>loop<br>return statistics;<br>endfunction | Returns performance statistics from a list of worker nodes. |
| @query<br>function getCoordinationState(current_client : ClientAddress) : CoordinationState<br>return CoordinationState(coordination_state.getPeersList( ).at( current_client<br>),coordination_state.getSyncMode( ),faulty_clients_list);<br>endfunction | Query function called by worker nodes to retrieve list of peers, synchronisation mode and list of faulty clients. |

The invention claimed is:

1. A distributed computer system, for managing collective learning of a plurality of worker nodes, that includes the plurality of worker nodes that are coupled together via a data communication network to exchange data therebetween, wherein collective learning of the worker nodes is managed within the distributed computer system, wherein the worker nodes include computing arrangements to process data therein, wherein operation of the distributed computer system is coordinated by employing a distributed ledger arrangement, wherein the distributed computer system is arranged to execute at least one smart contract via use of the distributed ledger arrangement, wherein the distributed computer system comprises a monitoring arrangement to provide learning parameters to each of the plurality of worker nodes by way of executing the at least one smart contract, wherein each of the worker nodes is operable to train a computing model based on the learning parameters and at least one set of training data, wherein the monitoring arrangement provides a reward to at least one of the worker nodes for training the computing model, wherein the reward is determined based on:

(i) a number and frequency of intermediary computing models provided by a given worker node to a remainder of the worker nodes; and (ii) a quality of the intermediary computing models, wherein the monitoring arrangement employs a plurality of synchronization modes to coordinate intermediary computing models communicated between the plurality of worker nodes, wherein, when in operation, the monitoring arrangement is configured to switch between the plurality of synchronization modes based on a data processing load being experienced at a given time by the distributed computer system.

2. The distributed computer system of claim 1, wherein the monitoring arrangement operates to exclude from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system.

3. The distributed computer system of claim 1, wherein the plurality of worker nodes employs machine learning algorithms to train the computing model.

4. The distributed computer system of claim 1, wherein in that the learning parameters provided by the monitoring arrangement comprise information relating to at least one of:

(i) a subset of worker nodes from the plurality of worker nodes receiving the intermediary computing models;

(ii) a synchronization mode that is followed by the plurality of worker nodes; and (iii) a latest intermediary computing model to be trained within the distributed computer system.

5. The distributed computer system of claim 1, wherein the at least one smart contract includes a compensation for the given worker nodes, wherein the compensation is determined based on the frequency and number of intermediary computing models that the given worker node provides to the remainder of the worker nodes.

6. A method of operating a distributed computer system, for managing collective learning of a plurality of worker nodes, that includes the plurality of worker nodes that are coupled together via a data communication network to exchange data therebetween, wherein the plurality of worker nodes includes computing arrangements to process data therein, wherein collective learning is managed wherein the distributed computing system, wherein the distributed computer system employs a distributed ledger arrangement to coordinate operation of the distributed computer system, wherein the distributed computer system is arranged to execute at least one smart contract via use of the distributed ledger arrangement, wherein the method includes:

(i) providing the distributed computer system with a monitoring arrangement to provide learning parameters to each of the plurality of worker nodes by way of executing the at least one smart contract, wherein each of the plurality of worker nodes is operable to train a computing model based on the learning parameters and at least one set of training data;

(ii) arranging for the monitoring arrangement to reward at least one of the plurality of worker nodes for training the computing model, wherein the reward is determined based on a number and frequency of intermediary computing models provided by a given worker node to a remainder of the worker nodes and the quality of the intermediary computing models; and (iii) employing a plurality of synchronization modes to coordinate intermediary computing models communicated between the plurality of worker nodes and, when in operation, switching between the plurality of synchronization modes based on a data processing load being experienced at a given time by the distributed computer system.

7. The method of claim 6, wherein the method comprises excluding from the distributed computer system, worker nodes whose number, frequency and/or quality of intermediary computing models provided thereby to the remainder of the worker nodes are below a predefined threshold and/or to exclude worker nodes whose intermediary computing models are found to be erroneous to operation of the distributed computer system.

8. The method of claim 6, wherein method comprises arranging for the plurality of worker nodes to employ machine learning algorithms to train the computing model.

9. The method of any one of the claim 6, wherein the method comprises arranging for the learning parameters provided by the monitoring arrangement to comprise information relating to at least one of:

(i) a subset of worker nodes from the plurality of worker nodes receiving the intermediary computing models;

(ii) a synchronization mode that is followed by the plurality of worker nodes; and (iii) a latest intermediary computing model to be trained within the distributed computer system.

10. The method of claim 6, wherein the at least one smart contract includes a compensation for the given worker nodes, wherein the compensation is determined based on the frequency and number of intermediary computing models that the given worker node provides to the remainder of the worker nodes.

11. A computer program product comprising a non-transitory computer-readable storage medium having computer-readable instructions stored thereon, the computer-readable instructions being executable by a computerized device comprising processing hardware to execute a method as claimed in claim 6.

* * * * *